United States Patent
Saito

(10) Patent No.: US 11,472,355 B2
(45) Date of Patent: Oct. 18, 2022

(54) VEHICLE FALLING-OVER DETECTION DEVICE

(71) Applicant: Alps Alpine Co., Ltd., Tokyo (JP)

(72) Inventor: Kyozo Saito, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 626 days.

(21) Appl. No.: 16/517,286

(22) Filed: Jul. 19, 2019

(65) Prior Publication Data

US 2019/0339073 A1 Nov. 7, 2019

Related U.S. Application Data

(63) Continuation of application No. PCT/JP2018/002673, filed on Jan. 29, 2018.

(30) Foreign Application Priority Data

Feb. 10, 2017 (JP) .............................. JP2017-023455

(51) Int. Cl.
| | |
|---|---|
| *G01C 9/00* | (2006.01) |
| *B60R 16/023* | (2006.01) |
| *G01C 9/06* | (2006.01) |
| *B62J 45/415* | (2020.01) |
| *B62J 45/414* | (2020.01) |

(52) U.S. Cl.
CPC ....... *B60R 16/0233* (2013.01); *B62J 45/4151* (2020.02); *G01C 9/06* (2013.01); *B62J 45/414* (2020.02)

(58) Field of Classification Search
CPC . B60R 16/0233; B62J 45/4151; B62J 45/414; G01C 9/06
See application file for complete search history.

(56) References Cited

U.S. PATENT DOCUMENTS

| | | | |
|---|---|---|---|
| 6,941,206 B2 | 9/2005 | Hasegawa et al. | |
| 7,616,042 B2 | 11/2009 | Suzuki | |
| 7,802,648 B2 | 9/2010 | Kamio | |
| 2005/0184476 A1* | 8/2005 | Hamm | B60G 7/006 280/5.502 |

(Continued)

FOREIGN PATENT DOCUMENTS

JP 2005057845 A * 3/2005

OTHER PUBLICATIONS

Translation of JP-2005057845-A.*

*Primary Examiner* — Max H Noori

(74) *Attorney, Agent, or Firm* — Crowell & Moring LLP

(57) ABSTRACT

A falling-over detection device is mounted on a motorcycle. The falling-over detection device includes an acceleration sensor that detects acceleration at an interval decided by an interval adjusting device, a threshold value determining device that determines whether or not a detected angle is larger than a predetermined threshold value, a counting device that counts the number of times it is determined that the detected angle is larger than the threshold value, and a falling-over determining device that determines that the motorcycle has fallen over in a case where the count is successive a predetermined number of times. The interval adjusting device uses a pulse generated based on white noise as an interval, and therefore noise does not successively affect a value detected by the acceleration sensor.

2 Claims, 4 Drawing Sheets

(56) References Cited

U.S. PATENT DOCUMENTS

| | | | |
|---|---|---|---|
| 2016/0280228 A1* | 9/2016 | Nakamura | B60W 30/19 |
| 2018/0178706 A1* | 6/2018 | Takahata | A61G 5/042 |
| 2019/0241118 A1* | 8/2019 | Fukunaga | G01C 9/06 |

* cited by examiner

VEHICLE FALLING-OVER DETECTION DEVICE

CLAIM OF PRIORITY

This application is a Continuation of International Application No. PCT/JP2018/002673 filed on Jan. 29, 2018, which claims benefit of priority to Japanese Patent Application No. 2017-023455 filed on Feb. 10, 2017. The entire contents of each application noted above are hereby incorporated by reference.

BACKGROUND

1. Field of the Disclosure

The present disclosure relates to a device that detects falling-over of a vehicle such as a motorcycle.

2. Description of the Related Art

Processing for stopping an engine of a vehicle such as a motorcycle when the vehicle has fallen over has been conventionally known. For example, Japanese Unexamined Patent Application Publication No. 2006-307782 (hereinafter referred to as Patent Literature 1) discloses an engine control device that includes inclination angle detection means for detecting inclination of a vehicle and a rider operation detection means for detecting whether or not a rider is operating the vehicle. In a case where an inclination angle of the vehicle continues to be larger than a predetermined angle in a state where the rider is not operating the vehicle, the engine control device determines that the vehicle has fallen over and stops an engine.

According to Patent Literature 1, the engine control device does not determine that the vehicle has fallen over in a case where the rider is operating the vehicle even in a case where the inclination angle of the vehicle is large. In this way, malfunction of the engine control device is prevented.

In this kind of falling-over detection device, means for preventing malfunction is provided so that engine stopping means does not act in a case where the vehicle actually has not fallen over, as in the device described in Patent Literature 1.

As for a vehicle such as a motorcycle, there are a large number of disturbance factors such as an electromagnetic wave from an outside, vibration from a road surface, vibration of an engine itself, and a pulse from an electric system. These disturbance factors sometimes appear as noise on output of angle detection means.

In a conventional device, inclination angle detection means detects an inclination angle of a vehicle periodically at constant intervals (e.g., one time per 10 msec). Some disturbance factors such as vibration of an engine itself occur in a cycle close to the constant cycle. Accordingly, if noise continues at intervals identical to intervals at which the inclination angle detection means detects the inclination angle of the vehicle, there is a risk of erroneous recognition that the vehicle has fallen over even in a case where the vehicle actually has not fallen over. In particular, in a case where the device performs control for stopping an engine in a case where the device determines that the vehicle has fallen over, the engine sometimes stops based on this erroneous recognition. If the engine stops during traveling, it is concerned that this leads to a falling-over accident.

SUMMARY

A vehicle falling-over detection device includes: inclination angle detector that detects an inclination angle of a vehicle; a counter that counts in a case where the inclination angle detected by the inclination angle detector is equal to or larger than a predetermined angle; and determining unit that determines that the vehicle has fallen over in a case where the counter counts successively a predetermined number of times, wherein the inclination angle detector includes interval deciding unit that decides a detection interval of detection of an angle of the vehicle, and wherein the interval deciding unit makes the detection interval irregular.

According to the vehicle falling-over detection device, the inclination angle detector detects an angle at an irregular detection interval decided by the interval deciding unit, and therefore even in a case where noise occurs in a constant cycle due to a disturbance factor, the noise does not always affect a detection value during detection of the inclination angle. Therefore, even if the inclination angle detector determines that the inclination angle of the vehicle is equal to or larger than the predetermined angle due to the noise, such erroneous detection does not successively occur. Since output of the counter does not successively occur accordingly, the determining unit can determine that a previous result of detection of the inclination angle is erroneous detection. It is therefore possible to prevent erroneous determination of falling-over of a vehicle.

DESCRIPTION OF THE EXEMPLARY EMBODIMENTS

Figure 1A:
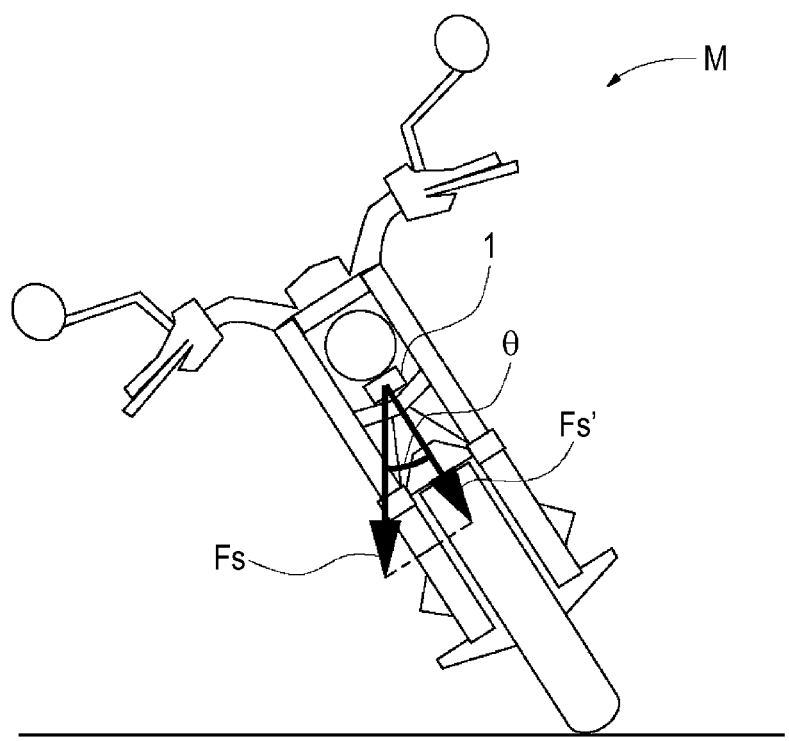
FIG. 1A is an explanatory view illustrating a state where a falling-over detection device according to an embodiment of the present invention is mounted on a motorcycle and the motorcycle is not moving and is inclined.

An exemplary embodiment of a vehicle falling-over detection device according to the present invention is described with reference to FIGS. 1 through 4. As illustrated in FIG. 1A, falling-over detection device 1 according to the present embodiment is mounted on a motorcycle (vehicle) M.

Figure 2:
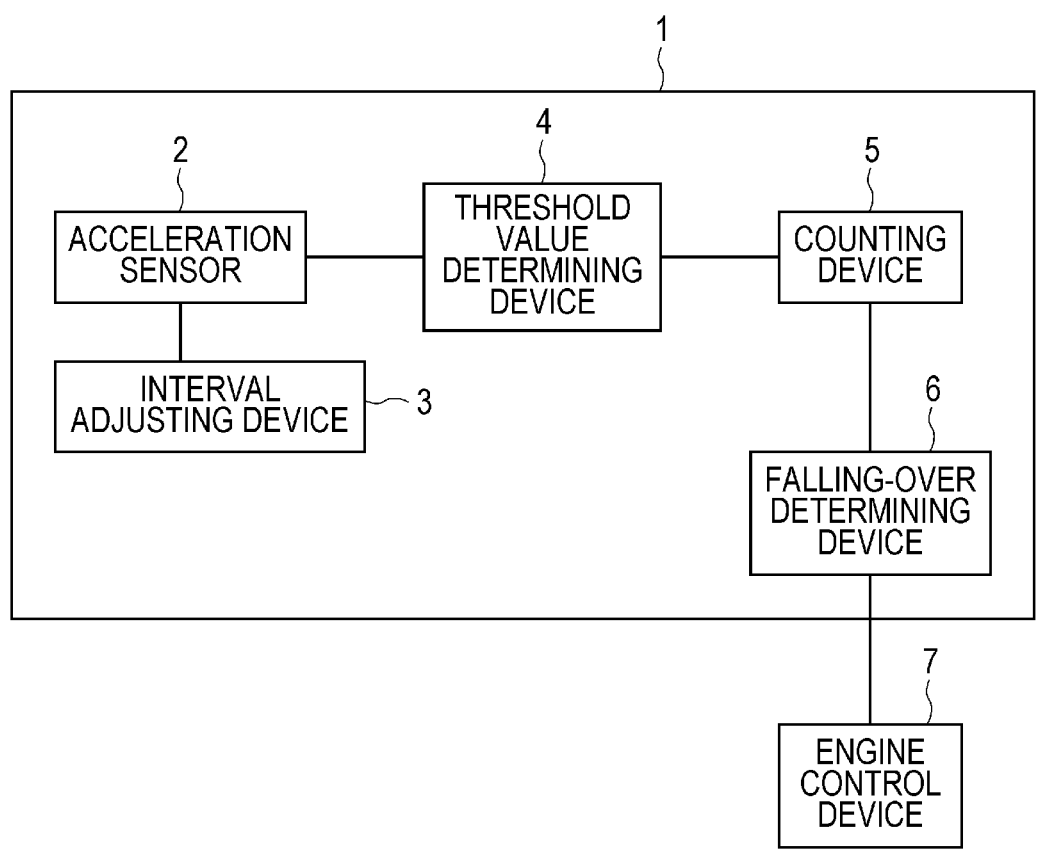
FIG. 2 is an explanatory view illustrating a functional configuration of a falling-over detection device according to the present embodiment.

As illustrated in FIG. 2, the falling-over detection device 1 according to the present embodiment includes an acceleration sensor 2 that is inclination angle detector and an interval adjusting device (interval deciding means) 3, and a threshold value determining device 4 that determines whether or not an angle detected by the acceleration sensor 2 is larger than a predetermined threshold value.

Furthermore, the falling-over detection device 1 includes a counting device (counter) 5 that counts the number of times the threshold value determining device 4 determines that the angle detected by the acceleration sensor 2 is larger than the predetermined threshold value and a falling-over determining unit 6 that determines that the motorcycle M has fallen over in a case where the count of the counting device 5 is successive a predetermined number of times.

Furthermore, the falling-over detection device 1 is connected to an engine control device 7 that controls an engine of the motorcycle M.

The acceleration sensor 2 has a movable part (not illustrated) elastically held inside the acceleration sensor 2. The acceleration sensor 2 detects acceleration that acts on this movable part and transmits a signal according to the acceleration to an outside. Furthermore, the acceleration sensor 2 detects acceleration in a vertical direction in a state where the motorcycle M stands vertically, i.e., acceleration in an up-down direction of the vehicle. In FIG. 1A, a direction indicated by arrow Fs' is a direction of detection of acceleration by the acceleration sensor 2.

FIG. 1A illustrates a state where the motorcycle M that is not moving is inclined by an angle θ. In the state where the motorcycle M is not moving, acceleration that acts on the motorcycle M is only gravitational acceleration g. In this state, force indicated by arrow Fs' is applied to the acceleration sensor 2.

Assume that a weight of the movable part provided in the acceleration sensor 2 is m, force m·g acts in a direction indicated by arrow Fs in FIG. 1. In this case, component force Fs' of arrow Fs is Fs·cos θ. Furthermore, the angle θ is found according to the following formula: θ=a cos{Fs'/(m·g)}.

In this case, in a case where θ is 0, i.e., in a case where the motorcycle M is standing upright, arrow Fs'=Fs=m·g, and the value is maximum. Meanwhile, in a case where θ becomes closer to 90°, arrow Fs' becomes closer to 0. Accordingly, in a case where the value of θ is found from the magnitude of arrow Fs' and a value of the angle θ at which it is determined that the motorcycle M has fallen over is set to the threshold value, it can be determined that the motorcycle M has not fallen over in a case where θ is less than the threshold value, and it can be determined that the motorcycle M has fallen over in a case where θ is equal to or larger than the threshold value. This threshold value can be, for example, set to 45°.

Figure 1B:
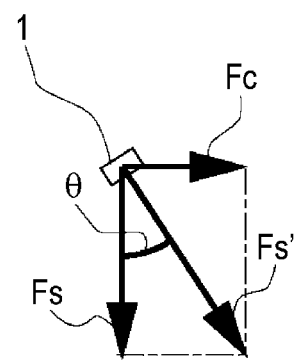
FIG. 1B is an explanatory view illustrating a vector of acceleration in a state where the motorcycle is traveling along a curve.

FIG. 1B illustrates a state of acceleration that occurs in a case where a rider is traveling on the motorcycle M along a curve. Arrow Fs in the vertical direction in FIG. 1B is similar to that in FIG. 1A, but centrifugal force is generated in a direction indicated by arrow Fc in FIG. 1B during traveling along a curve. Accordingly, the magnitude of arrow Fs' detected by the acceleration sensor 2 is a synthetic vector of arrow Fs and arrow Fc.

Accordingly, even in a case where the motorcycle M is traveling along a curve at an angle θ similar to the angle θ in FIG. 1A, the acceleration found by the acceleration sensor 2 is larger than that in the state where the motorcycle M is not moving. Therefore, in the present embodiment, t is not erroneously recognized that the motorcycle M has fallen over even in a case where the motorcycle M is inclined at a large angle during traveling along a curve.

Figure 3:
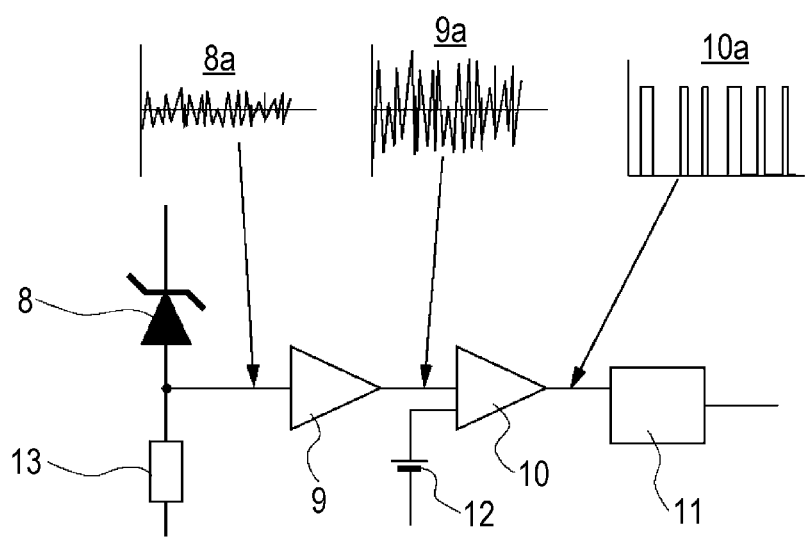
FIG. 3 is an explanatory view illustrating an example of an interval adjusting device in the falling-over detection device according to the present embodiment.

The acceleration sensor 2 detects acceleration in accordance with an interval of a signal emitted from the interval adjusting device 3. As illustrated in FIG. 3, the interval adjusting device 3 includes a Zener diode 8 that is white noise generating means, an amplifier 9 that is pulse signal generating means, a comparator 10, and a counter 11. The Zener diode 8 receives power from a power source circuit, and the comparator 10 compares signals supplied from a power source for reference voltage 12 and the amplifier 9. Furthermore, a resistor 13 is provided in FIG. 3.

In the interval adjusting device 3, the Zener diode 8 generates white noise, the amplifier 9 amplifies the white noise, and the comparator 10 performs waveform shaping into a pulse signal. In the interval adjusting device 3, the counter 11 counts up the signal from the comparator 10, and the acceleration sensor 2 detects acceleration while using the count as a trigger of an interval (detection interval) of signal detection.

FIG. 3 illustrates a waveform 8a output from the Zener diode 8, a waveform 9a output from the amplifier 9, and a waveform 10a output from the comparator 10.

As described above, the interval adjusting device 3 according to the present embodiment corresponds to interval deciding means according to the present invention, the Zener diode 8 according to the present embodiment corresponds to noise generating means according to the present invention, the amplifier 9, the comparator 10, and the counter 11 according to the present embodiment correspond to pulse signal generating means according to the present invention.

The threshold value determining device 4, the counting device 5, and the falling-over determining device 6 according to the present embodiment include electronic devices (not illustrated) such as a microprocessor (MPU), a random access memory (RAM), and a read only memory (ROM) and a program stored in the ROM and the like.

The threshold value determining device 4 determines whether or not acceleration detected by the acceleration sensor 2 is larger than a predetermined threshold value. The counting device 5 cumulatively adds up the number of times the threshold value determining device 4 determines that output of the acceleration sensor 2 is less than the threshold value. Meanwhile, the counting device 5 is configured to reset the accumulated counts in a case where the threshold value determining device 4 determines that the output of the acceleration sensor 2 is equal to or larger than the threshold value, as described later. The falling-over determining device 6 determines that the motorcycle M has fallen over in a case where the number of counts of the counting device 5 is larger than a predetermined number (e.g., 100).

Figure 4:
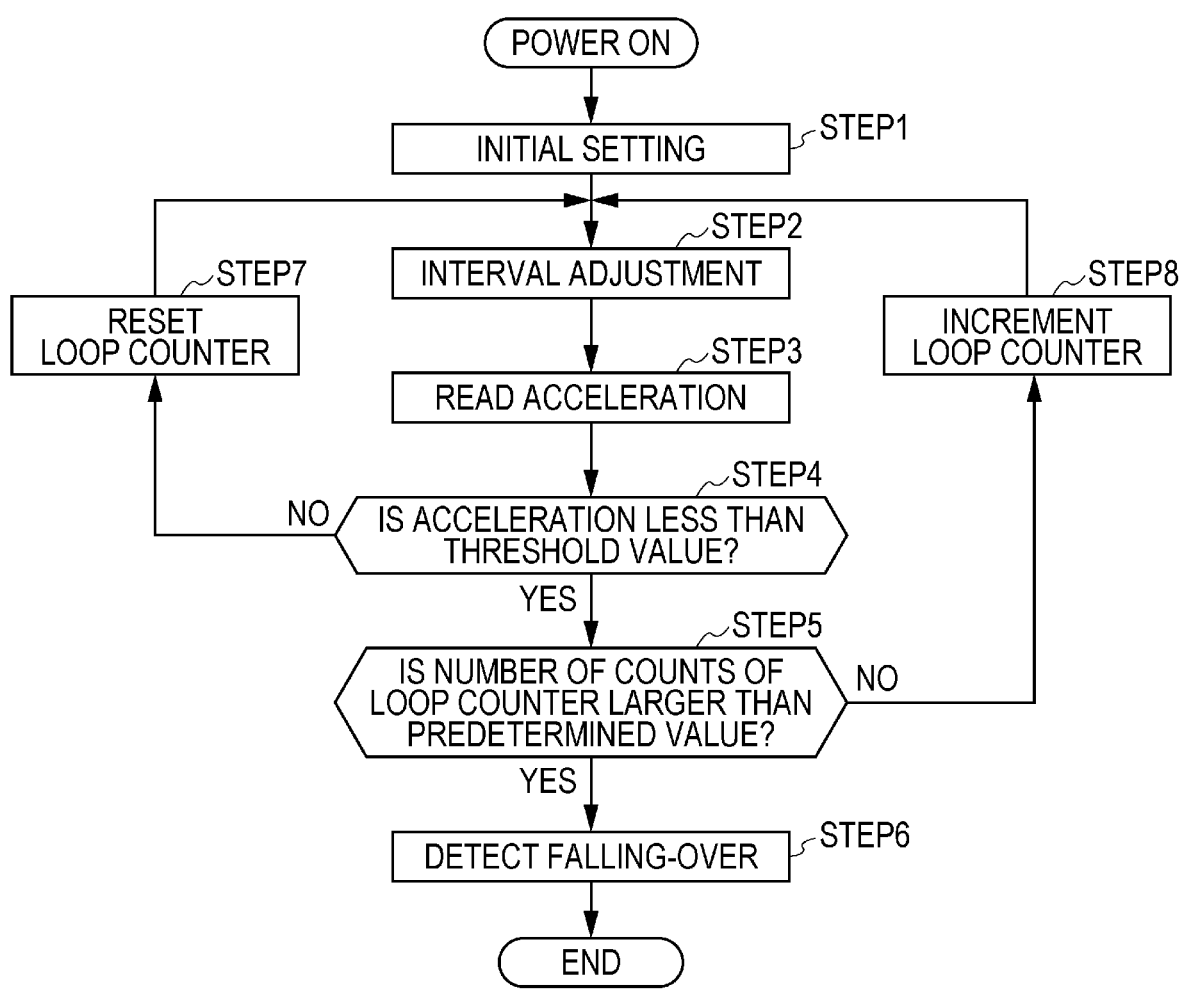
FIG. 4 is a flowchart illustrating operation of the falling-over detection device according to the present embodiment.

Next, operation of the falling-over detection device 1 according to the present embodiment is described with reference to FIG. 4. In a case where a rider is driving the motorcycle M, an ignition switch (not illustrated) is on and power is on accordingly, and an engine is operating. In this case, in the falling-over detection device 1, initial settings are made (STEP1), and counts of the counting device 5 in previous traveling are reset if any.

Next, the falling-over detection device 1 decides an interval of acceleration detection performed by the acceleration sensor 2 on the basis of a signal from the interval adjusting device 3 (STEP2). This processing makes an interval of acceleration detection performed by the acceleration sensor 2 irregular.

Next, the acceleration sensor 2 detects acceleration at the interval thus made irregular (STEP3). Next, the threshold value determining device 4 compares the acceleration detected by the acceleration sensor 2 with a threshold value. A case where the acceleration detected by the acceleration sensor 2 is equal to or larger than the threshold value (NO in STEP4) is a case where the angle θ of the motorcycle M is small. In this case, the motorcycle M has not fallen over, and therefore a loop counter is reset in the counting device 5 (STEP7). In this case, the processing returns to a point before STEP2, and interval adjustment (STEP2) and acceleration reading (STEP3) are performed.

A case where the acceleration detected by the acceleration sensor 2 is less than the threshold value (YES in STEP4) is a case where the angle θ of the motorcycle M is large enough to exceed a threshold value used for determination of falling-over, and therefore the falling-over determining device 6 verifies whether or not the number of counts of the loop counter is larger than a predetermined value (STEP5).

In the present embodiment, the falling-over determining device 6 determines that the motorcycle M has fallen over in a case where the loop counter counts successive 100 times. This time, the acceleration detected by the acceleration sensor 2 is less than the threshold value for the first time, and therefore the number of counts of the loop counter is not larger than the predetermined value (NO in STEP5). In this case, the counting device 5 increments the loop counter by 1, and then the processing returns to a point before STEP2.

In a case where the motorcycle M has actually fallen over, a state where the acceleration detected by the acceleration sensor 2 is less than the threshold value continues, and therefore the processes in STEP2 through STEP5 are repeated, and as a result, the number of counts of the loop counter becomes larger than the predetermined value (YES in STEP5). In this case, the falling-over detection device 1 determines that the motorcycle M has fallen over and gives the engine control device 7 a notification about falling-over (STEP6). The engine control device 7 turns off the ignition switch and stops the engine upon receipt of the notification about falling-over from the falling-over detection device 1.

According to the falling-over determining device 6 according to the present embodiment, the acceleration sensor 2 detects an angle at an irregular interval decided by the interval adjusting device 3. Accordingly, even in a case where noise occurs at constant intervals (in a constant cycle), for example, due to vibration of an engine or due to an electric system, the interval of acceleration detection performed by the acceleration sensor 2 is irregular and does not always match a cycle of generation of the noise. Therefore, this noise does not successively affect a value acquired by the acceleration sensor 2. Therefore, the falling-over determining device 6 according to the present embodiment has high resistance against a disturbance factor and therefore can prevent erroneous determination of falling-over of a vehicle.

Although the motorcycle M has been described as an example of a vehicle in the above embodiment, the above embodiment is not limited to this and is applicable to vehicles that have a risk of falling-over depending on a situation such as three-wheeled vehicles called trikes and ships.

The interval adjusting device 3 according to the present embodiment decides an interval of acceleration detection performed by the acceleration sensor 2 by setting a circuit constant of a circuit including the Zener diode 8 and count-up in the counter 11. Accordingly, in a case where the falling-over detection device 1 according to the present invention is applied to a vehicle other than the motorcycle M, the settings can be adjusted in accordance with properties of the vehicle. The interval adjusting device 3 may use a preset irregular pulse interval repeatedly instead of using the Zener diode 8 and the like.

What is claimed is:

1. A vehicle falling-over detection device comprising:
   inclination angle detector that detects an inclination angle of a vehicle;
   a counter that counts in a case where the inclination angle detected by the inclination angle detector is equal to or larger than a predetermined angle; and
   a determining unit that determines that the vehicle has fallen over in a case where the counter counts successively a predetermined number of times, wherein
   the inclination angle detector includes an interval deciding unit that decides a detection interval of detection of an angle of the vehicle,
   the interval deciding unit makes the detection interval irregular,
   and
   the interval deciding unit includes:
      a noise generator that generates white noise, and
      a pulse signal generator that generates a pulse signal from the white noise; and
      a pulse interval of the pulse signal is used as the detection interval.

2. The vehicle falling-over detection device according to claim 1, wherein
   the inclination angle detector detects acceleration in a vertical direction in a vertically standing state of the vehicle by using an acceleration sensor.

* * * * *